Feb. 14, 1961 A. M. NICHOLSON, JR., ET AL 2,971,968
ORTHO, ORTHO'-BIS(PARA-1,1,3,3-TETRAMETHYLBUTYLPHENOL) MONOSULPHIDE
Filed Jan. 29, 1959 2 Sheets-Sheet 1

INVENTORS
ALBRIGHT M. NICHOLSON, JR. AND
BARUCH ZAREMSKY
BY Bates, Teare & McBean
ATTORNEYS Feb. 14, 1961  A. M. NICHOLSON, JR., ET AL  2,971,968
ORTHO, ORTHO'-BIS(PARA-1,1,3,3-TETRAMETHYLBUTYLPHENOL) MONOSULPHIDE
Filed Jan. 29, 1959  2 Sheets-Sheet 2

INVENTORS
ALBRIGHT M. NICHOLSON, JR.
BARUCH ZAREMSKY
BY Bates, Teare & McBean
ATTORNEYS

United States Patent Office 2,971,968
Patented Feb. 14, 1961

2,971,968
ORTHO, ORTHO'-BIS(PARA-1,1,3,3-TETRA-METHYL-BUTYLPHENOL) MONOSULPHIDE

Albright M. Nicholson, Jr., Warrensville Heights, and Baruch Zaremsky, South Euclid, Ohio, assignors to Ferro Corporation, Cleveland, Ohio, a corporation of Ohio Filed Jan. 29, 1959, Ser. No. 789,908

5 Claims. (Cl. 260—439)

This invention relates, as indicated, to a new chemical compound, crystalline ortho,ortho'-bis(p-1,1,3,3-tetramethylbutylphenol) monosulphide, certain salts thereof, and the process of producing the same.

Figure 1:
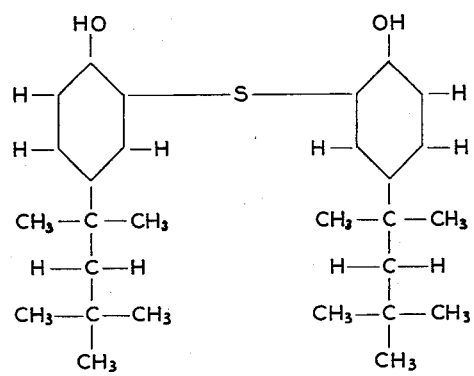

This composition of matter has the structural formula shown in Fig. 1 in the annexed drawing. The product is a crystalline material having a melting point of 132°–134° C.

The product shown in Fig. 1 is produced from p-1,1,3,3-tetramethylbutylphenol by reaction with sulphur dichloride, $SCl_2$, in a suitable medium, from which the product forms as a relatively insoluble precipitate, relatively free of by-products and other impurities. The product thus formed is easily removable by conventional mechanical separation methods.

Sulphur dichloride is not a pure substance, and in its commercial form consists principally of an equilibrium mixture of reactants and products of the reaction:

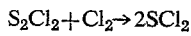

$$S_2Cl_2 + Cl_2 \rightarrow 2SCl_2$$

Figure 2:
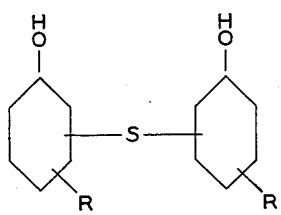

In the use of either $S_2Cl_2$ or the equilibrium mixture referred to above, which is normally represented as $SCl_2$, the reaction product of sulphurization of monoalkyl phenols generally comprise a mixture of compounds of the types shown in Figs. 2, 3, 4 and 5 in the annexed drawings. Fig. 2, for example, shows a phenol monosulphide with the sulphur linkage between the two aromatic groups randomly disposed. The R group is likewise indefinitely located and merely signifies at least one alkyl substituent attached to a ring carbon atom. The ring structures in Figs. 2, 3, 4 and 5 represent phenyl groups, the hydrogen atoms attached to the various ring carbon atoms not being shown. In Figs. 2 through 5, $n$ is a number greater than 1, and $x$ is a number than 1. More complex compounds in which the aryl groups number more than 2 and the linkages between them are different, either occurring in some regular fashion or occurring without detectable regularity may also be formed. In addition, some chlorinated compounds may be expected to be formed. It is characteristic of the compounds of Figs. 2 through 5 that they are generally mutually soluble, the mixtures being characteristically dark colored, uniform, viscous liquids, and that they are generally soluble in the same solvents. The separation of these components from each other and from unreacted reactants is generally quite difficult and is in some cases feasible only by very precise fractional distillation.

The alkyl phenol, p-1,1,3,3-tetramethylbutylphenol, is currently available on the market in solid form. This material is unique in that the o,o-monosulphide thereof is virtually insoluble in aliphatic hydrocarbon solvents. It is also unique in that the o,o'-monosulphide thereof when present in sufficiently high concentration in aromatic or chlorinated hydrocarbon solvents, can be crystallized and removed mechanically, even in the presence of substantial quantities of the compounds of Figs. 2–5.

The product of Fig. 1 possesses unique characteristics which make it particularly useful in the manufacture of light stabilizers for certain polyalkylenes, e.g., polyethylene, as will be more particularly described below.

The peculiar solubility characteristics of the crystalline monosulphide of this invention makes possible the use of aliphatic hydrocarbon solvents, a solvent system not hitherto regarded as useful in the preparation of sulphurized phenols. With conventional sulphurized phenols, no crystallization occurs and preference is expressed for low molecular weight chlorinated solvents of low viscosity and high volatility properties, which assist in solvent removal operations. In such operations, no attention is paid to differential solubility because during and after sulphurization no phase separation is evident. Sometimes highly aromatic solvents like benzene, toluene or xylene have also been suggested. In both the chlorinated hydrocarbons and the highly aromatic compounds, important toxicological hazards are involved. In the case of the production of the monosulphide of the current invention, such solvents may be used but aliphatic hydrocarbons are more advantageous because they permit higher recovery since they emphasize the unique solubility characteristics of this compound. The relatively low toxicity of aliphatic hydrocarbons represents an additional advantage of working in that system.

The monosulphide of this invention is surprisingly insoluble even in the presence of materials having formulas corresponding with one or more of the compounds represented by Figs. 2, 3, 4 and 5, and the sulphurized dialkylphenols normally present in the sulphurization of reaction mass. This observation is not deducible from the behavior of known compounds of analagous structure and offers a unique opportunity for commercial utilization. For example, the para-nonyl, para-tertiary-amyl, para-tertiary-butyl, para-dodecyl phenol, etc. o,o-monosulphides are all soluble in aliphatic hydrocarbons, as well as other known organic solvents useful in sulphurization. The purification of alkyl phenol monosulphides other than that of Fig. 1 is extremely difficult and can be accomplished only at great expense and generally at extremely low yield by high vacuum distillation or by the use of a series of special solvents. This has rendered such purification unattractive and has, therefore, directed commercial utilization along the lines of seeking uses for the unpurified sulphurized phenols.

The peculiar behavior of the p-1,1,3,3-tetramethylbutylphenolmonosulphide described above, which does not manifest itself with the amyl phenol monosulphides or the nonyl phenol monosulphides or the dodecyl phenol monosulphides permits purification of this alkyl phenol monosulphide by crystallization and filtration, and where further purity is required simply by washing the filter cake preferably with light aliphatic hydrocarbons or by repulping and-refiltering.

It should be noted that the advantages obtainable by the use of aliphatic hydrocarbons are not lost by the inclusion in the solvent of minor fractions of aromatic solvents. Excellent commercial solvents, useful in this process may contain up to 20% of aromatic constituents. It is possible by working at much higher concentrations of p-1,1,3,3-tetramethylbutylphenol in the solvent to employ wholly aromatic or even chlorinated hydrocarbon solvents. In such cases, however, for comparable yields of the monosulphide of the present invention, filtration rates are generally much lower and there is greater need for additional washing and repulping to obtain acceptable purity of product. In fact, if aromatic or chlorinated solvents are used also for the washing and repulping steps, it is hardly possible to duplicate the yields obtainable in the aliphatic hydrocarbon system. As would be expected, aromatic solvents containing alkyl benzenes with a relatively large proportion of carbon atoms in the alkyl group or groups (e.g. tertiary amyl benzene), are superior in solvent characteristics to those in which the carbon atoms are very largely in the ring structure (e.g., benzene, toluene, xylene).

The crystalline product of Fig. 1 differs markedly from all known homologous alkyl phenol monosulphides in that it may be recovered in crystalline form from a reaction mass carried in a suitable solvent, and particularly petroleum ether having a boiling point range of from 30–60° C. This crystallization occurs even in the presence of soluble phenol disulphides and polymeric monosulphides such as represented in Figs. 2 through 5. Specific homologues with which this product differs in this property include o,o'-bis(p-tertiaryamylphenol) monosulphide; o,o'-bis(p-tertiarybutylphenol) monosulphide; and o,o'-bis(p-1,3,5-trimethylhexylphenol) monosulphide. These latter materials are soluble in aliphatic hydrocarbons or other solvents and apparently do not precipitate in crystalline form from the reaction masses.

Figure 3:
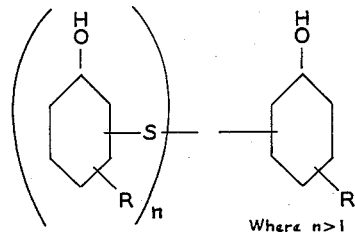
Figure 4:
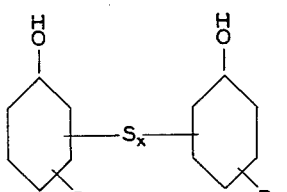
Figure 5:
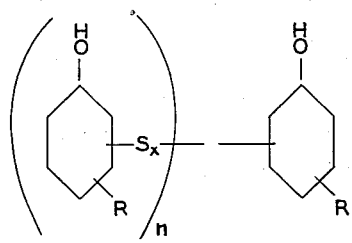

Further important differences are noted with respect to isomeric compounds. The corresponding compound to that shown in Fig. 1 in which the tetramethylbutyl group is located in the ortho position is non-crystalline and hence does not lend itself to separation from aliphatic hydrocarbon reaction masses in the manner of the para substituted derivative. The corresponding dialkyl substituted phenol monosulphides are also non-crystalline. The o,o'-disulphide of the para-1,1,3,3-tetramethylbutylphenol is also non-crystalline. The presence of polymeric materials corresponding to Figs. 3, 4 and 5 are also non-crystalline.

It becomes convenient to describe a method by which crystalline o,o' - bis(p - 1,1,3,3 - tetramethylbutylphenol) monosulphide (Fig. 1) is produced. Generally speaking, this product is produced by reacting the crystalline p-1,1,3,3-tetramethylbutylphenol with sulphur dichloride at a temperature from about 120–145° F. in a solvent. The reaction may be conducted in a 50 gallon steam jacketed glass lined vessel when the quantities employed are as follows:

EXAMPLE 1

150 lbs. of p-1,1,3,3-tetramethylbutylphenol,
7.5 gallons saturated aliphatic hydrocarbon solvent (flash point —10° F., boiling range 145°–196° F.—Bronoco H.B. 200),
37.5 lbs. sulphur dichloride The p-1,1,3,3-tetramethylbutylphenol is added to the solvent and the mixture heated to 120° F. to obtain a clear solution. The sulphur dichloride is added with agitation to the solution, the rate of addition of the SCl₂ being limited by the capacity of the equipment to eliminate HCl, and recover solvent, without foaming over. For the above formulation in the indicated equipment, it is desirable to keep the sulphurization temperature between 120° F. and 145° F. with adequate condenser capacity and provisions for disposing of the liberated hydrogen chloride, temperatures up to the boiling point of the solvent may be employed.

After the indicated quantity (stoichiometric) of sulphur dichloride has been added, the batch is cooled to below about 90° F. and allowed to stand for 12 hours in order to permit crystal growth. The fully crystallized batch is then filtered. The filter cake is then re-slurried with an equal weight of the saturated aliphatic hydrocarbon solvent and filtered again. The cake is left on the filter until the major portion of the solvent has been drawn off. At this point, the volatiles are down to less than about 5% by weight of the total cake mass. Typically, the yield is 35%–45% of theoretical.

This product is a light yellow to white crystalline powder, analyzing, in the particular sample, 7.5% sulphur (theoretical 7.24) and 0.1% chlorine. This crystalline product is o,o'-bis(p-1,1,3,3-tetramethylbutylphenol) monosulphide (Fig. 1). While filtration is used for the removal of the liquid phase in the examples described herein, other mechanical methods of removing the polysulphide-containing liquid phase are also acceptable, e.g., centrifugation, settling, counter-current washing, and related conventional procedures.

While it is convenient, and a preferred mode of carrying out the production of the compound corresponding to Fig. 1 in a reaction mass characterized by the presence therein of a normally liquid saturated aliphatic hydrocarbon, it is also possible to produce the product responding to the formula of Fig. 1 in a medium which is a solvent for not only the products of Figs. 2, 3, 4 and 5, but also that of Fig. 1. After the reaction is complete, the solvent may then be stripped off and the resulting mass re-worked with a normally liquid saturated aliphatic hydrocarbon. The product responding to the formula of Fig. 1 is recovered as a crystalline material from the re-worked mass.

EXAMPLE 2

A solution of 200 grams of p-1,1,3,3-tetramethylbutylphenol in 640 grams of carbon tetrachloride is prepared at room temperature and then cooled to 45° F. with strong agitation. At this temperature the p-1,1,3,3-tetramethylbutylphenol tends to come out of solution but this is of little concern as long as the mixture is kept under agitation. 50 grams of SCl₂ admixed and in solution with 50 grams of carbon tetrachloride is added over a period of about 1 hour, and the mixture allowed to agitate for an hour after the addition has ceased. After overnight standing, the mixture is washed with water to extract HCl, boiled to drive off the carbon tetrachloride and any residual dissolved HCl, cooled and then diluted with 200 grams of petroleum ether having a boiling range of from 30°–60° C. The more highly sulphurized products such as shown in Figs. 3, 4 and 5 are soluble in the petroleum ether. The product responding to the formula of Fig. 1 separates out as a crystalline white solid which is easily filtered.

Table I below shows the results obtained with various commercially available hydrocarbon solvents. The column headed "Percent Concentration" refers to the concentration of p-1,1,3,3-tetramethylbutylphenol in the indicated solvent.

Table I.—Yield of o,o'-bis(p-1,1,3,3-tetramethylbutylphenol) monosulphide in different solvents when the phenol is initially present at a concentration of 20% by weight in the solution.

| Solvent | Analysis of Solvent—percent by weight, ° F. | | | | Percent Yield |
|---|---|---|---|---|---|
| | Aromatic | Naphthenic | Paraffin | B.P. Range | |
| Petroleum Ether | | | 100 | 86–140 | 40 |
| Hexane | | | 100 | 156 | 40 |
| Heptane | | | 100 | 209 | 40 |
| Kwik Dri Klensol | 10 | 23 | 65 | 308–361 | 17 |
| Shellsol 72 | | | 100 | 350–394 | 20 |
| Amyl benzene | 100 | | | Ca350 | 17 |

NON-HYDROCARBONS

| | |
|---|---|
| Chloroform | 0 |
| Carbontetrachloride | 0 |
| Ethylene chloride | 0 |

At higher initial concentration of the p-1,1,3,3-tetramethylbutylphenol in the solvent improved yields are obtained. Thus at a 61% concentration in Kwik Dri Klensol a 27% yield is obtained. Yields in excess of 30% can be obtained on carbon tetrachloride at initial concentrations above 60%.

Table II illustrates a preferred class of solvents used at 77% initial concentration.

Table II.—*Yield of o,o'-bis(p-1,1,3,3-tetramethylbutylphenol) monosulphide in different solvents when the phenol is initially present at a concentration of 77% by weight in the solution.*

| Solvent | Analysis of Solvent—percent by weight, °F. | | | | Percent Yield |
|---|---|---|---|---|---|
| | Aromatic | Naphthenic | Paraffin | B.P. Range | |
| Amsco W-2 | 16 | 2 | 82 | 314–335 | 40 |
| Bronoco HB 200 | | | 100 | 145–196 | 37 |
| Amsco LEP | | | 100 | 313–349 | 41 |
| Shellsol 360 | 7 | 35 | 58 | 315–358 | 41 |

In general, we prefer to use paraffinic hydrocarbons, and these may have a boiling point range of from about room temperature to about 400° F. If aromatic constituents are present in the solvent, it is preferred that these be maintained below about 20%. Higher concentrations of the p-1,1,3,3-tetramethylbutylphenol in the original solvent mixture tend to favor higher yields.

Figure 7:
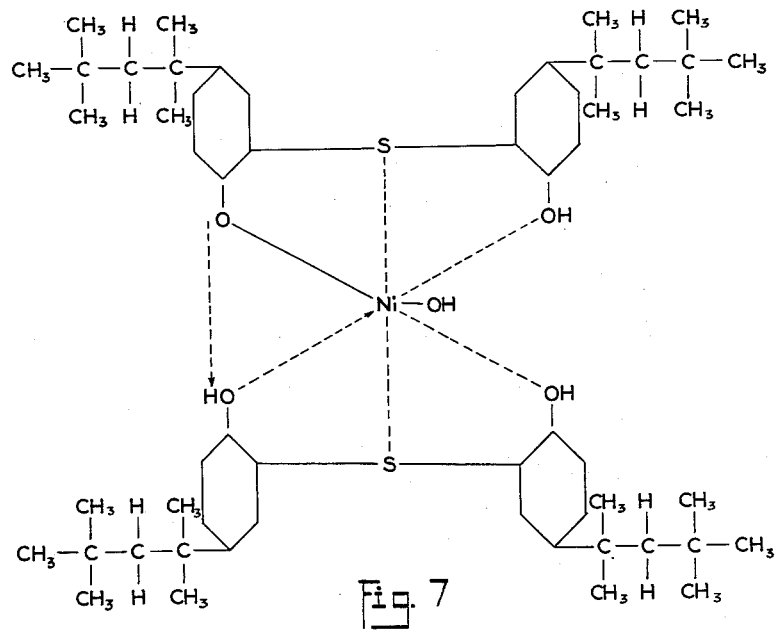
Figure 8:
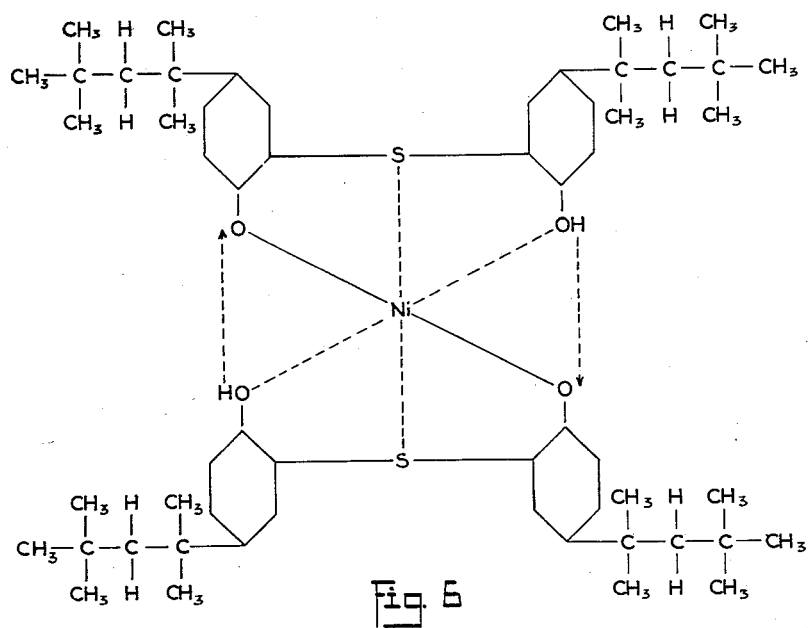

As previously indicated, the product of Fig. 1 is particularly useful in the production of nickel derivatives which in turn are useful as addition agents to certain polyalkylenes, for the stabilization of these polymers against the deleterious effects of ultraviolet light. The latter are the subject of co-pending applications of C. H. Fuchsman et al., Serial No. 800,629, filed March 20, 1959, and Serial 813,459, filed May 15, 1960, respectively. As disclosed therein, the amount of such nickel material so utilized is in the range of from 0.05% to about 5% by weight. Figs. 6 and 7 show two useful nickel derivatives of the o,o'-bis(p-1,1,3,3-tetramethylbutylphenol) monosulphide of Fig. 1.

The nickel phenol-phenolate of Fig. 6 may be produced by metathetical reaction by converting the crystalline product of Fig. 1 to the sodium salt by reaction of such product with one-half of the stoichiometric amount of sodium ethoxide dissolved in ethanol (5.8% sodium) theoretically required for replacement of all the phenolic hydrogen, and carrying out such reaction in anhydrous ethanol solution. Thereafter, the reaction mass is treated with an ethanol solution of nickel chloride (28 grams nickel per liter), containing nickel at least equivalent to the sodium present which results in the precipitation of sodium chloride. If the solution be evaporated to dryness a complex ethanolate appears to be formed containing 5.5% Ni. However, on refluxing this mixture with a hydrocarbon solvent and removing the alcohol thus vaporized, appreciable quantities of the compound of Fig. 6 appears to be formed, having a theoretical Ni content of 6.23%.

By the use of stoichiometric amounts of sodium, the ethanolate and the normal (or full) nickel phenolate of crystalline o,o'-bis(p-1,1,3,3-tetramethylbutylphenol) may be prepared. This product is also useful in the light stabilization of certain polyalkylenes.

Alternatively, the product of Fig. 1 may be reacted with nickel acetate tetrahydrate in xylene solution (50% concentration) by direct reaction using one-half the stoichiometric amount of nickel acetate tetrahydrate for replacement of all the phenolic hydrogen. The product which is obtained by this reaction is a light green crystalline material which appears to be characterized by the general formula of Fig. 7. A product produced in this manner analyzes 6.08% nickel with a theoretical nickel content of 6.12%.

A similar product can be obtained using in place of the nickel acetate tetrahydrate, metal salts of weak acids (of ionization constant $<1\times10^{-4}$), which acids have appreciable vapor pressures at the boiling point of the solvent, thus facilitating the removal of acid from the reaction mass. The presence of some water appears to be essential for this reaction, and if the water is not present as water of hydration of the nickel salt, it is often desirable to add free water.

The nickel compounds of Figs. 6 and 7 are light green products which are particularly useful as light stabilizing additives for polyethylene since in the amounts added to the polymer, these materials impart so little color to the plastic as to be unobjectionable. The use of non-crystalline monosulphide materials, or those monosulphides which are contaminated by the presence therein of polysulphides or polymeric monosulphides are less satisfactory from the standpoint of color in that they possess the brownish discoloration typical of such substances.

The crystalline form of o,o'-bis(p-1,1,3,3-tetramethylbutylphenol) monosulphide is the only substance found suitable for the production of nickel derivatives suitable for the light stabilization of certain polyalkylenes without imparting, at effective concentrations, brown color, objectionable in plastic sheet, film and fiber in their conventional uses. The non-crystalline reaction products of sulphurization of the p-1,1,3,3-tetramethylbutylphenol or the combined reaction products prior to separation of the crystalline fraction are unsatisfactory. Other phenols which do not afford even the opportunity of crystallization and separation as described above are similarly objectionable in the color after nickel derivatives, and the colors which those derivatives, used in effective concentration, impart to the materials to be safeguarded against deterioration.

There has thus been provided a novel crystalline form of o,o'-bis(p-1,1,3,3-tetramethylbutylphenol) monosulphide whose production and utility depend upon its surprising solubility characteristics, and on the remarkably good coloration resulting when the nickel derivatives thereof are used in polyalkylenes.

The nickel derivatives, unlike the metal-free o,o'-bis(p-1,1,3,3-tetramethylbutylphenol) monosulphide are quite soluble in low molecular weight hydrocarbons as well as high molecular weight polymeric hydrocarbons, such as certain commercially available polyalkylenes. Thus, solubilities of the monosulphide may be commonly less than 1% in hydrocarbons, while the nickel derivatives are often soluble in amounts exceeding 20%.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The process of making crystalline o,o'-bis(p-1,1,3,3-tetramethylbutylphenol) monosulphide which comprises reacting crystalline p-1,1,3,3-tetramethylbutylphenol dissolved in an aliphatic hydrocarbon solvent with $SCl_2$ in an amount sufficient to form the monosulphide of said phenol under conditions of time and temperature sufficient to substantially complete the reaction as evidenced by the cessation of evolution of HCl, and recovering the suspended crystalline o,o'-bis(p-1,1,3,3-tetramethylbutylphenol) monosulphide from the reaction medium by mechanically removing the liquid phase.

2. The process of making crystalline o,o'-bis(p-1,1,3,3-tetramethylbutylphenol) monosulphide which comprises reacting crystalline p-1,1,3,3-tetramethylbutylphenol dissolved in a chlorinated hydrocarbon solvent with $SCl_2$ in an amount sufficient to form the monosulphide of said phenol, under conditions of time and temperature sufficient to substantially complete the reaction as evidenced by the cessation of evolution of HCl, stripping off by-product HCl and chlorinated hydrocarbon solvent, taking up the residue of said stripping operation in an aliphatic hydrocarbon solvent and recovering the suspended crystalline o,o'-bis(p-1,1,3,3-tetramethylbutylphenol) monosulphide from said hydrocarbon medium by mechanically removing the liquid phase.

3. In the process of making the nickel phenolphenolate of crystalline o,o,'-bis-(p-1,1,3,3-tetramethylbutylphenol) monosulphide, the steps which comprise reacting crystalline p-1,1,3,3-tetramethylbutylphenol dissolved in an aliphatic hydrocarbon solvent with $SCl_2$ in an amount sufficient to form the monosulphide of said phenol under conditions of time and temperature sufficient to substantially complete the reaction as evidenced by the cessation of evolution of HCl, recovering crystalline o,o,'-bis-(p-1,1,3,3-tetramethylbutylphenol) monosulphide from the reaction medium by mechanically removing the liquid phase, dissolving said crystalline monosulphide in an aromatic hydrocarbon, and adding thereto one-half the stoichiometric amount of nickel acetate tetrahydrate for replacement of all the phenolic hydrogen, and removing the solvent and by-products of reaction.

4. The process of claim 3, in which the aromatic hydrocarbon is xylene.

5. In the process of making the nickel phenol-phenolate of crystalline o,o,'-bis-(p-1,1,3,3-tetramethylbutylphenol) monosulphide, the steps which comprise reacting crystalline o,o'-bis-(p-1,1,3,3-tetramethylbutylphenol) monosulphide in solution in an aliphatic hydrocarbon solvent, adding thereto one-half the stoichiometric amount of nickel acetate tetrahydrate for replacement of all the phenolic hydrogen and recovering the nickel phenol-phenolate of crystalline o,o'-bis-(p-1,1,3,3-tetramethylbutylphenol) monosulphide containing approximately 6.23 percent nickel by removing the solvent and by-product of reaction.

References Cited in the file of this patent

UNITED STATES PATENTS 2,449,026     Van Gilder _____ Sept. 7, 1948

OTHER REFERENCES

Niederl: Ind. and Eng. Chem., vol. 30 (1938), pages 1269 to 1274.

UNITED STATES PATENT OFFICE
CERTIFICATION OF CORRECTION

Patent No. 2,971,968            February 14, 1961

Albright M. Nicholson, Jr., et al.

It is hereby certified that error appears in the above numbered patent requiring correction and that the said Letters Patent should read as corrected below.

Column 1, line 47, after "number", second occurrence, insert -- greater --.

Signed and sealed this 13th day of June 1961.

(SEAL)
Attest:

ERNEST W. SWIDER
Attesting Officer

DAVID L. LADD
Commissioner of Patents